Sept. 9, 1969  L. MEYER  3,465,382
MEANS FOR PROCESSING SCALLOPS FOR THE MARKET
Original Filed April 13, 1966  2 Sheets-Sheet 1
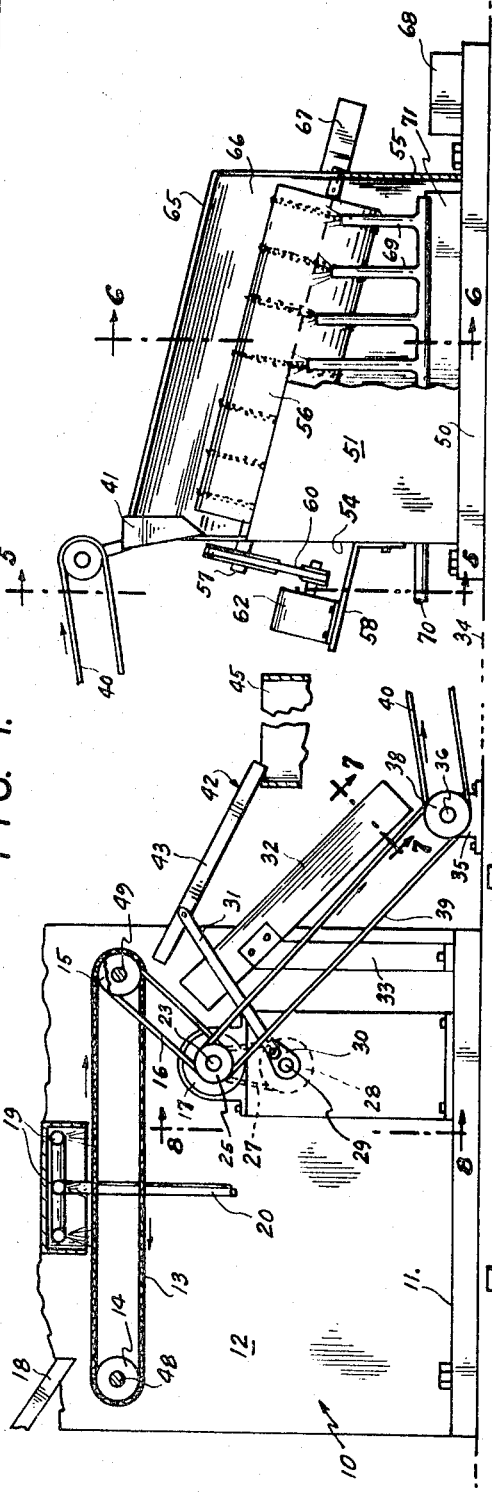
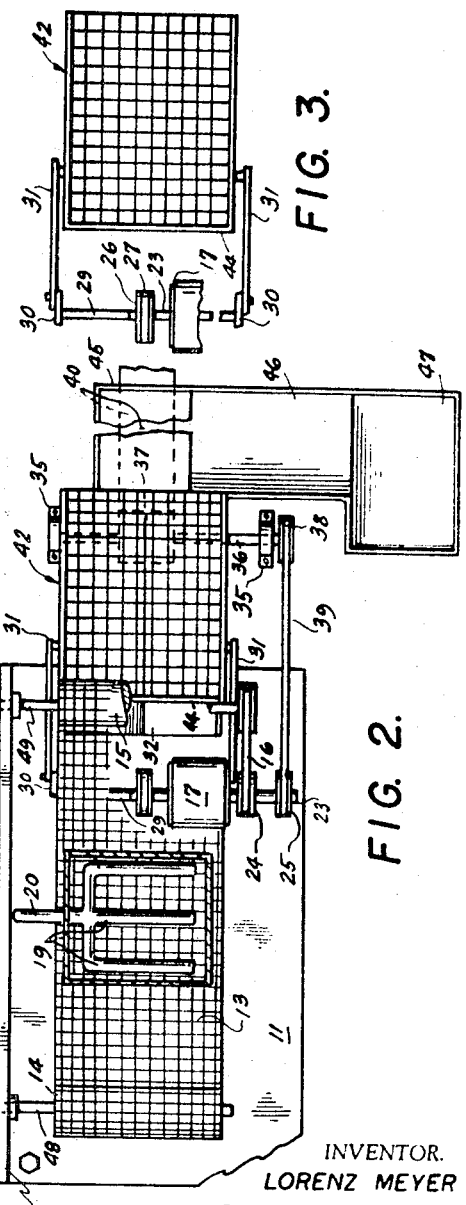
INVENTOR.
LORENZ MEYER
BY
ATTORNEY Sept. 9, 1969   L. MEYER   3,465,382
MEANS FOR PROCESSING SCALLOPS FOR THE MARKET
Original Filed April 13, 1966   2 Sheets-Sheet 2

INVENTOR.
LORENZ MEYER
BY *J. Ledermann*
ATTORNEY

United States Patent Office 3,465,382
Patented Sept. 9, 1969

3,465,382
MEANS FOR PROCESSING SCALLOPS
FOR THE MARKET
Lorenz Meyer, 212 E. Main St.,
East Islip, N.Y. 11730
Original application Apr. 13, 1966, Ser. No. 542,252, now Patent No. 3,417,423, dated Dec. 24, 1968. Divided and this application July 8, 1968, Ser. No. 764,977
Int. Cl. A22b 3/08; A22c 29/00
U.S. Cl. 17—53                                    3 Claims

ABSTRACT OF THE DISCLOSURE

Whole scallops are carried on a conveyor belt under downwardly directed jets of steam to loosen the shells and deposite them on a downwardly sloping agitated screen having a mesh which permits the meats to fall through while preventing the shells from doing so, the shells being discharged from the screen into a hopper. Under the screen is a downwardly sloping V-shaped chute to receive the meats which, as they descend the chute, are guided along the median line thereof approximately in single file in which formation they are deposited on a second conveyor belt to be carried into a viscerating machine.

---

This application is a division of application Ser. No. 542,252, filed Apr. 13, 1966, now patent No. 3,417,423, issued Dec. 24, 1968.

This invention relates to automatic means for processing scallops for speedy delivery to the market in fresh condition.

Up to the present it has been the practice to remove the shells from the scallops as well as the viscera, by hand, as a consequence of which there has been a tremendous waste caused by rotting of the scallops in the shell owing to a lack of facilities for processing them promptly after they are gathered. For example, a boat may return to dock only twelve days after the scallops have begun to be taken out of the water so that upon unloading a large percentage especially of those gathered early are found to be spoiled. Additionally, there is a shortage of labor to shuck and eviscerate the scallops in a boat load.

The present invention provides means both for shucking and for eviscerating the scallops in a continuous automatic process, and the machinery provided therefore can be made small enough to be installed in the boat so that the marketable scallop meats are prepared quickly after the scallops are lifted from the water, whence they are either refrigerated or placed in an iced box or bin. In this way wastage is completely eliminated.

An object of the invention is therefore the provision of a machine for shucking or shelling whole scallops.

Another object of the invention is the provision of a machine for eviscerating shucked scallops and delivering the marketable scallop meats into a receiver therefor.

Still another object of the invention is the provision of a continuously functioning machine which includes means for shucking the scallops and a machine for eviscerating the shucked scallops and means for delivering the shucked schallops into the eviscerating machine.

A still further object of the invention is the provision of a continuous process which consists in the steps of feeding whole scallops into a machine which shucks them and delivers the shucked scallops into a machine which eviscerates them and finally discharges the scallop meats.

The above as well as additional objects will be clarified in the following description wherein reference numerals refer to like-numbered parts in the accompanying drawing. It is to be noted that the drawing is intended primarily for the purpose of illustration and that it is therefore neither desired nor intended to limit the invention necessarily to any or all of the exact details shown or described except insofar as they may be deemed essential to the invention.

Referring briefly to the drawing:

FIG. 1 is a side elevational view, with parts broken away and partly in section, of a complete continuously operating machine for shucking whole scallops and then eviscerating them.

FIG. 2 is a top plan view of the left-hand portion of FIG. 1, with parts broken away and partly in section, and with parts omitted, and also enlarged.

FIG. 3 is a top plan view of the shucking screen of FIG. 2 and the means for agitating it.

Figure 4:
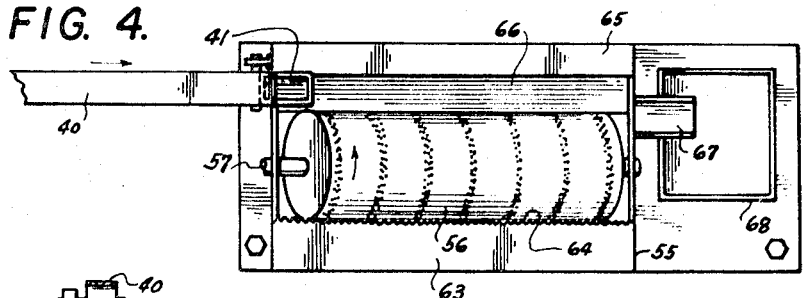
FIG. 4 is a top plan view of the right-hand portion of FIG. 1, that is, the eviscerating machine.

Referring in detail to the drawing, the numeral 10 indicates the frame of the shucking machine, and for the purpose of simplicity this is shown merely L-shaped in cross-section, consisting of a base 11 bolted to the floor and an upright wall 12.

A horizontal flat wire screen conveyor belt 13 is mounted on two rollers 14 and 15, the latter shown turned by a belt 16 driven by a motor 17. A hopper or chute 18 is positioned over the left-hand end, FIG. 1, of the belt 13, through which whole scallops are fed on to the belt, the scallops thus being conveyed to the right. Between the ends of this belt a number of branch pipes which are shown at 19 and are perforated at the bottom, extend from a steam feed pipe 20. The pipes 19 are positioned to direct steam down upon the belt 13 and are covered by a hood 21.

The motor 17 is supported on top of an inverted U-shaped bracket bolted to the base 11, shown at 22. The motor shaft 23 extends from both ends thereof; two spaced pulleys 24, 25 are fixed on one end of the shaft, the former having the belt 16 trained thereon and the belt 16 is also trained on a pulley fixed on the shaft of the roller 15 to drive the same. The other end of the shaft has a pulley 26 thereon and a belt 27 on the pulley 26 is trained about a pulley 28 on a shaft 29 extending through both arms of the bracket 22. On each end of the shaft 29 is an eccentric 30 to which is pivoted an elongated arm 31.

A chute 32 having angular sloping sides and sloping downward, is supported by brackets 33 shown bolted to the base 11; only one such bracket is shown, in FIG. 1. In FIG. 1 the surface of the floor on which the machinery rests is indicated by the line 34. Rotatably mounted in pedestals 35 shown bolted to the floor is a shaft 36 having a roller 37 thereon, positioned substantially intermediate the length of the shaft. A belt 39 is trained about the pulleys 38 and 25. A conveyor belt 40 is trained about the roller 37, leading upward to the hopper 41 of the eviscerator machine described below.

A screen having a mesh too small to permit scallop shells to pass therethrough but large enough to permit passage of the shucked scallops, is shown at 42, having side walls 43 and a rear, left-hand, end wall 44 but no front, right-hand, wall. The arms 31 have their upper ends pivoted to the side walls 43, and the lower or front end of the screen is shown resting on the rim of a hopper or the like 45 leading into a chute 46 to enter a receptacle 47 resting on the floor forward, FIG. 2, of the base 11.

The operation of the shucker is as follows. Whole scallops, as gathered from the water, are dropped on to the conveyor belt 13 through the hopper 18, with the motor 17 running. In traveling to the right, the scallops pass under the steam jets issuing from the pipes 19. The steam rapidly heats the shells of the scallops, causing them to open, but since the steam acts on the scallops for only a brief interval it does not cause any "cooking" of the scallop meats. When the scallops with their shells open pass over the right hand end of the belt 13, they drop on to the screen 42 which, owing to the eccentric connection 30, 31, is agitated up and down, thus causing the shells to be separated from the scallops. The scallop insides, including the meats with viscera attached, drop through the screen into the chute 32, while the shells are carried off the front of the screen to drop into the hopper 45 and thence collect in the receptacle 47.

Owing to the angular cross-section of the chute 32, the shucked scallops fall into a single file, or close thereto along the bottom median line of the chute, and they thus pass out of the chute on to the conveyor belt 40.

It is to be noted that, for the sake of simplicity, the shafts of the rollers 14 and 15, i.e., shafts 48 and 49, are shown supported only in one end in the wall 12; obviously supports for the other ends may readily be provided by one skilled in the art.

Figure 5:
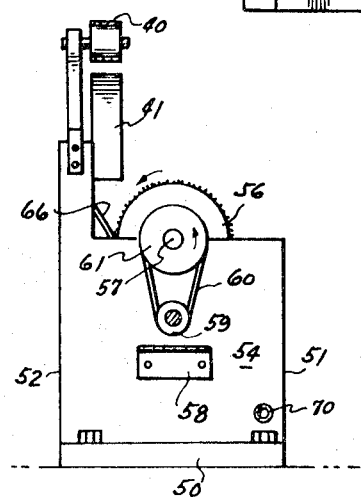
FIG. 5 is a sectional view taken on the line 5—5 of FIG. 1.

The eviscerating machine shown at the right of FIG. 1, is shown having a frame including a base 50 bolted to the floor 34, a front wall 51, a rear wall 52, and end walls 54 and 55. A cylindrical brush 56 is rigid on a shaft 57 rotatably supported at a sloping angle in the end walls 54 and 55. This brush may be a wire brush or it may have any suitable surface which is sufficiently abrasive for the purpose desired. A motor 62 mounted on a shelf 58 secured to the wall 54 drives a pulley 59, and through a belt 60 engaging a pulley 61 on the brush shaft 57 it drives the brush in the rotational direction of the arrow, FIG. 5.

The top edge of the front wall 51 has the same slope as the axis of the brush and it lies in a common plane at right angles to the paper, FIG. 1, through the axis of the brush, or approximately so. A comb in the form of a ledge 63 extends from the top edge of the wall 51 substantially into contact with the brush surface; the active edge of the comb, as shown at 64, is serrated, although the serrations are magnified in FIG. 4 for the purpose of illustration. The back wall 52 has an overhang 65, and a sloping baffle 66 is mounted as shown to provide an angular trough between the baffle and the brush. The hopper 41 is positioned above the baffle at the right end of the brush. Through an opening in the wall 55 a chute 67 extends from just below the lower ends of the baffle and the brush, to discharge into a vessel 68 or, not shown, means such as a conveyor belt.

Figure 6:
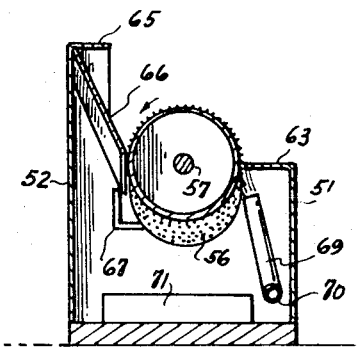
FIG. 6 is a sectional view taken on the line 6—6 of FIG. 1.
Figure 8:
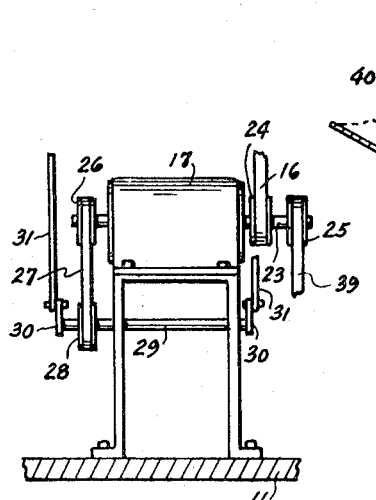
FIG. 8 is a fragmentary sectional view taken on line 8—8 of FIG. 1.
Figures 7, 9:
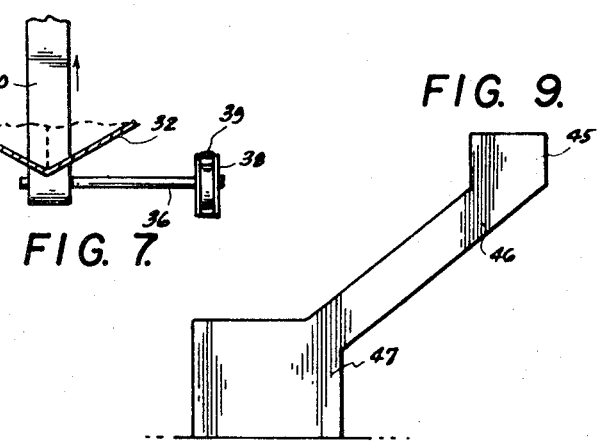
FIG. 7 is a sectional view taken on the line 7—7 of FIG. 1.
FIG. 9 is a side elevation view of the shell receiving chute and receptacle.

The operation of the eviscerator is as follows. As shucked scallops are delivered from the conveyor belt 40 in practically single file into the hopper 41, they drop into the crotch formed between the brush and the baffle 66, while the motor 62 is running to rotate the brush in the direction of the arrows, FIGS. 4, 5 and 6. The viscera of scallops are loosely attached to the meats and are mostly on the outside thereof. The action of the brush on the scallops causes quick detachment of the viscera, which are carried down below the baffle edge by the rotating brush while leaving the scallop meats behind. However, owing to the slope of the brush and baffle downward toward the end 55 of the frame, the meats gradually roll down into and through the trough 67 to be collected in the receptacle 68. The viscera which are carried down on the brush below the baffle and which remain attached thereto, are stopped from being carried all the way around by the comb edge 64. Since they could accumulate excessively there, the following means is further provided to loosen them from the comb as well as the brush. Streams of cold water are directed by branch pipes 69 leading from a feed pipe 70 at the line where the comb edge meets the brush, as shown in FIG. 6. This loosens the viscera so that they fall into a receptacle set within the frame, whence it may be removed when desired.

Thus machinery has been provided for shucking whole scallops as well as eviscerating them in a continuous process to obtain fresh scallop meats ready for the market.

In order to avoid unnecessary cluttering up of the drawing by showing details which are not needed by one skilled in the art of brushes, only longitudinally spaced circumferential portions of the bristles on the brush 56 are shown in FIGS. 1 and 4, but it is to be understood that bristles cover the entire surface of the cylinder.

I claim:

1. Means for shucking scallops comprising a perforate substantially horizontal conveyor belt adapted to have whole scallops deposited thereon at one end thereof, means for actuating said belt, means mounted above said belt for directing steam upon the scallops to cause the shells thereof to open, a downwardly sloping screen having a mesh smaller than the scallop shells but larger than the shucked scallops mounted below the other end of said belt to receive the open-shell scallops therefrom, means for agitating said screen to detach the shells to permit them to be moved by gravity down and off the screen for disposal thereof while the shucked scallops fall through the screen.

2. Means for shucking scallops according to as defined in claim 1, having a downwardly sloping V-shaped chute positioned under said screen to receive the shucked scallops and to guide them substantially along the median line thereof so that they fall off the chute in approximately single file formation, a second conveyor belt having one end positioned under the lower end of said chute to receice and convey to a distance the shucked scallops, and means for actuating said conveyor belts and said agitating means.

3. Means for shucking scallops as defined in claims 1 or 2, having a hopper mounted below the lower end of said screen and having the lower end of the screen resting on the rim thereof, said means for agitating said screen comprising a pulley mounted on a horizontal axis below and transverse to said belt, said pulley having a crank thereon, a rod having one end thereof pivoted to said crank and the other end thereof pivoted to said screen near the upper end of the screen, and means connecting said belt-actuating means with said pulley for simultaneously rotating said pulley, the shells shucked from the scallops falling from said screen into said hopper.

References Cited

UNITED STATES PATENTS

| 2,008,820 | 7/1935 | Doxsee et al. | 17—2 |
| 2,608,716 | 9/1952 | Harris | 17—45 |
| 2,808,612 | 10/1957 | Snow | 17—2 X |
| 2,929,502 | 3/1960 | Harris. | |
| 3,037,237 | 6/1962 | Lapeyre | 17—9 |
| 3,177,522 | 4/1965 | Renfroe | 17—2 |
| 3,203,034 | 8/1965 | Matzer et al. | 17—2 |
| 3,230,578 | 1/1966 | Marvin et al. | 17—9 |
| 3,320,631 | 5/1967 | Brown | 17—2 |

LUCIE H. LAUDENSLAGER, Primary Examiner

U.S. Cl. X.R.

17—48